United States Patent
Lee et al.

(10) Patent No.: US 7,583,989 B2
(45) Date of Patent: Sep. 1, 2009

(54) SLIDING-TYPE HINGE

(75) Inventors: Feng-Chi Lee, Taipei Hsien (TW);
Chih-Hung Chan, Taipei Hsien (TW);
Shu-Fang Li, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 591 days.

(21) Appl. No.: 11/405,612

(22) Filed: Apr. 18, 2006

(65) Prior Publication Data
US 2007/0243912 A1    Oct. 18, 2007

(51) Int. Cl.
*H04M 1/00* (2006.01)

(52) U.S. Cl. ............. 455/575.4; 455/575.8; 455/575.1; 455/550.1; 455/90.3; 455/73; 379/433.01; 379/433.12; 379/433.11

(58) Field of Classification Search ................ 455/90.3, 455/73, 66.1, 575.8, 575.4, 575.1, 550.1; 379/433.01, 433.12, 433.11
See application file for complete search history.

(56) References Cited

U.S. PATENT DOCUMENTS

| | | | | |
|---|---|---|---|---|
| 7,319,892 | B2* | 1/2008 | Kato | 455/575.4 |
| 7,438,486 | B2* | 10/2008 | Ho | 396/448 |
| 2005/0164753 | A1* | 7/2005 | Kato | 455/575.4 |
| 2005/0197173 | A1* | 9/2005 | Wee et al. | 455/575.4 |
| 2006/0046796 | A1* | 3/2006 | Park et al. | 455/575.4 |
| 2006/0211460 | A1* | 9/2006 | Jeong et al. | 455/575.4 |
| 2006/0223596 | A1* | 10/2006 | Hur | 455/575.4 |
| 2007/0032278 | A1* | 2/2007 | Lee et al. | 455/575.4 |
| 2007/0060220 | A1* | 3/2007 | Hsu | 455/575.4 |
| 2007/0091555 | A1* | 4/2007 | Lee | 361/683 |
| 2007/0105605 | A1* | 5/2007 | Park et al. | 455/575.4 |
| 2007/0105606 | A1* | 5/2007 | Yoon et al. | 455/575.4 |
| 2008/0064456 | A1* | 3/2008 | Cha et al. | 455/575.4 |
| 2008/0096619 | A1* | 4/2008 | Kuga et al. | 455/575.4 |
| 2008/0125200 | A1* | 5/2008 | Park et al. | 455/575.4 |
| 2008/0127455 | A1* | 6/2008 | Lee | 16/225 |
| 2008/0153558 | A1* | 6/2008 | Mifune et al. | 455/575.4 |
| 2008/0167096 | A1* | 7/2008 | Huang et al. | 455/575.4 |
| 2008/0194304 | A1* | 8/2008 | Satoshi et al. | 455/575.4 |
| 2008/0207284 | A1* | 8/2008 | Jung et al. | 455/575.4 |
| 2008/0209683 | A1* | 9/2008 | Lee | 16/352 |
| 2008/0242380 | A1* | 10/2008 | Kajihara et al. | 455/575.4 |

FOREIGN PATENT DOCUMENTS

JP    2002-300243 A    10/2002

* cited by examiner

*Primary Examiner*—Matthew D Anderson
*Assistant Examiner*—Erica Fleming-Hall
(74) *Attorney, Agent, or Firm*—Birch, Stewart, Kolasch & Birch, LLP (57) ABSTRACT

A sliding-type hinge includes a base, a slider, and a sliding means adapted to slide the slider on the base. The sliding means includes a first torsion spring and a second torsion spring. The first torsion spring has a first connecting end connected to one side of the base, and a third connecting end connected to the other side of the slider. The second torsion spring has a second connecting end connected to the slider and being at the same side with the third connecting end, and a fourth connecting end connected to the base and being at the same side with the first connecting end. At the closing status, the first and second connecting end are at the front of the third and fourth connecting end. At the opening status, the first and second connecting end are at the rear of the third and fourth connecting end.

20 Claims, 8 Drawing Sheets

FIG. 8

SLIDING-TYPE HINGE

BACKGROUND OF THE INVENTION

1. Field of the Invention

The present invention relates to a hinge, and more particularly to a sliding-type hinge.

2. The Related Art

Along with the diversification of design of the portable apparatus, recently, a portable apparatus having a sliding housing which is capable of sliding on a body housing for exposing or covering a keypad zone on the body housing is gradually widely applied.

A sliding-type hinge adapted for a portable apparatus is disclosed in Japanese Patent Application Laid-open No. 2002-300243. The portable apparatus includes a body housing and a sliding housing. The sliding-type hinge includes a pair of sliding means. Each sliding means includes a sliding member, an accommodating plate secured to the sliding housing for accommodating the sliding member, and a guide plate supporting the sliding member in cooperation with the accommodating plate and formed with a guide hole for guiding the sliding member.

However, the structure of such sliding-type hinge is somewhat complicated to deploy. Furthermore, the sliding-type hinge is disposed at the two sides of the portable apparatus, thus inevitably affects the appearance of the portable apparatus.

SUMMARY OF THE INVENTION

An object of the present invention is to provide a sliding-type binge mounted in a portable apparatus. The portable apparatus includes a body housing and a sliding housing capable of sliding forward and backward on the body housing by means of the sliding-type hinge to open from and close into the body housing. The sliding-type hinge includes a base fixed on the body housing, a slider fixed on the sliding housing and a sliding means enabling the slider moving forward and backward on the base. The sliding means includes a first torsion spring and a second torsion spring disposed between the base and the slider. The first torsion spring has a first connecting end connected to one side of the base and a third connecting end connected to the other side of the slider. The second torsion spring has a second connecting end connected to the slider, especially locating at the same side with the third connecting end, and a fourth connecting end connected to the base, especially locating at the same side with the first connecting end. When the sliding housing is closed into the body housing, the first connecting end and the second connecting end are located at the front of the third connecting end and the fourth connecting end. The first torsion spring and the second torsion spring are arranged in a cross-configuration. When the sliding housing is opened from the body housing, the first connecting end and the second connecting end are located at the rear of the third connecting end and the fourth connecting end. The first torsion spring and the second torsion spring are arranged in a cross-configuration as well. Therefore, the sliding-type hinge enables the portable apparatus to open and close, and has advantages of simplifying the structure.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
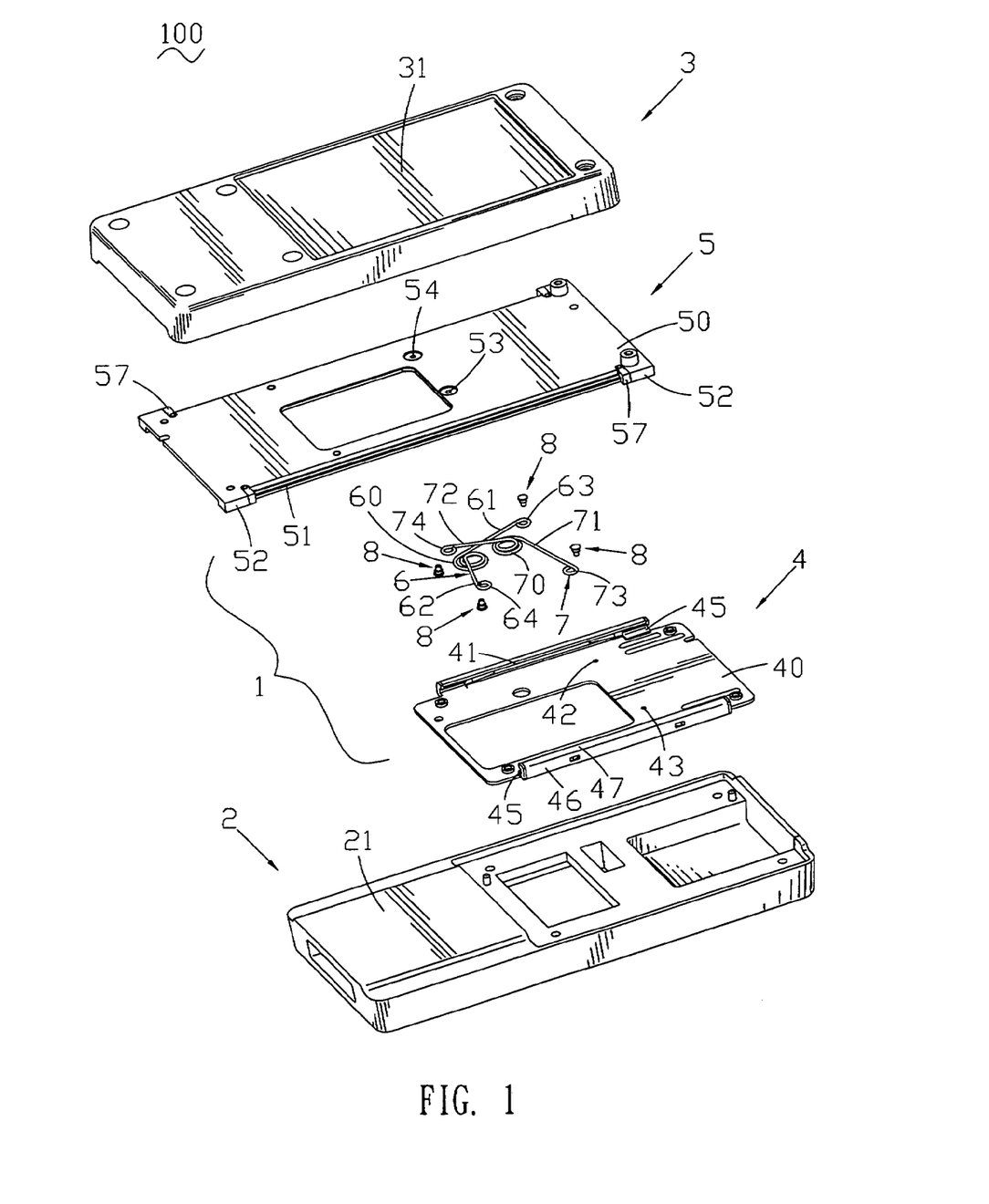
FIG. 1 is an exploded view of a mobile phone with a sliding-type hinge in accordance with the present invention.
Figure 2:
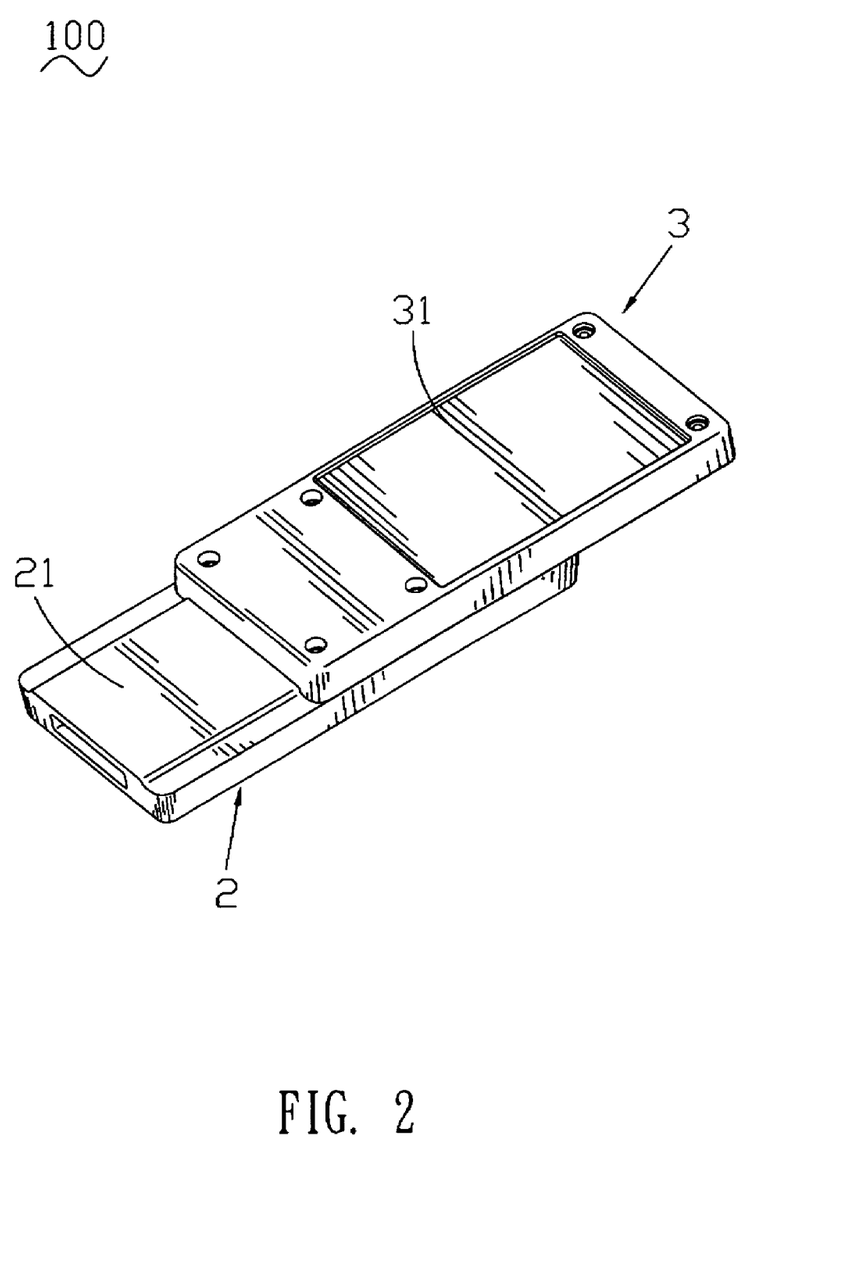
FIG. 2 is an exterior view showing the mobile phone as shown in FIG. 1 at the opening status.

With reference to FIG. 1 and FIG. 2, a sliding-type hinge 1 in accordance with the present invention is adapted for a portable apparatus. In this embodiment, the portable apparatus is a mobile phone 100. The mobile phone 100 includes a body housing 2 and a sliding housing 3 disposed on the body housing 2. The body housing 2 has circuit boards (not shown) and a keypad zone 21 disposed on a lower part thereof. The sliding housing 3 has a transparent screen 31 disposed on an upper part thereof. The sliding-type hinge 1 slides the sliding housing 3 forward and rearward along the body housing 2 in order to open from or close into the body housing 2, so that the keypad zone 21 would be either exposed outside or covered by the sliding housing 3.

Referring to FIG. 1 again, the sliding-type hinge 1 includes a base 4 fixedly disposed on the upper part of the body housing 2, a slider 5 fixedly disposed at the bottom of the sliding housing 3 and sliding on the base 4, and a sliding means disposed between the base 4 and the slider 5. The sliding means includes a first torsion spring 6 and a second torsion spring 7.

Figure 3:
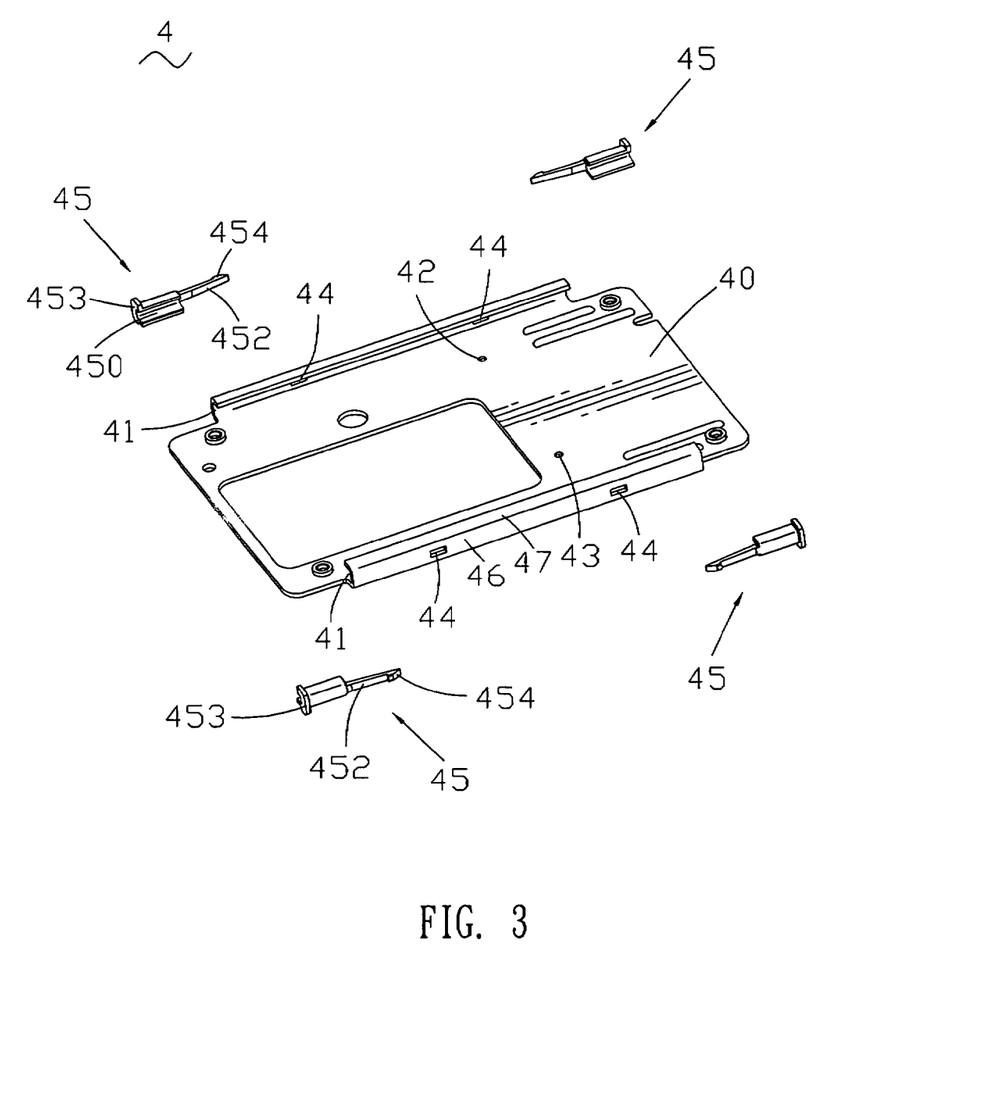
FIG. 3 is an exploded view of a base of the sliding-type hinge in accordance with the present invention.
Figure 4:
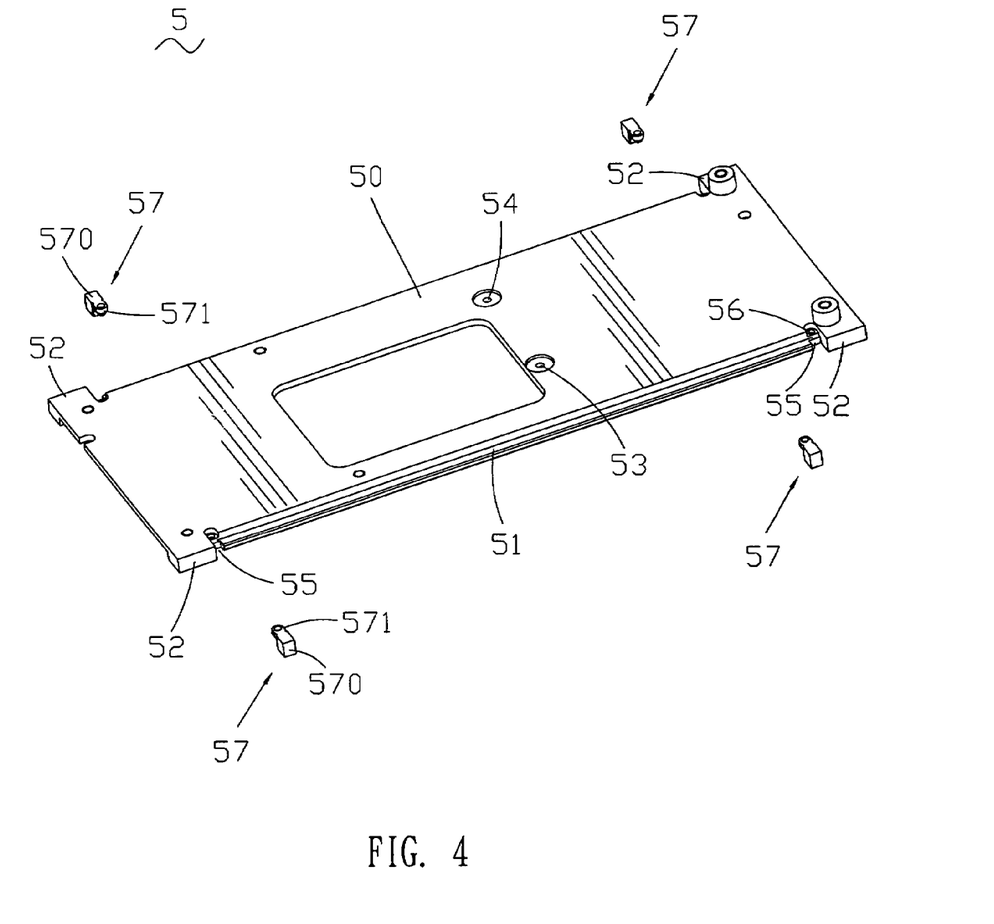
FIG. 4 is an exploded view of a slider of the sliding-type hinge in accordance with the present invention.

With referring to FIG. 3, the base 4 has a bottom plate 40 and a pair of L-shaped sliding chutes 41 longitudinally and upwardly extending from two opposite sides of the bottom plate 40. The bottom plate 40 has a first connecting hole 42 and a second connecting hole 43 respectively positioned at two sides of the approximate middle thereof. Each sliding chute 41 is composed of a vertical plate 46 and a level plate 47. The vertical plate 46 has a pair of holding openings 44 respectively defined at the front and rear sides thereof. The base 4 further includes four retainers 45 respectively disposed in the sliding chutes 41. Each retainer 45 has an approximate U-shaped chute body 450, an elastic arm 452 extending from one end of side portion of the chute body 450, and a contacting portion 453 extending perpendicularly outwardly from the other end of the chute body 450. The elastic arm 452 has a holding portion 454 extending outwardly from the end thereof Referring to FIG. 4, the slider 5 has a base plate 50, a pair of sliding rails 51 longitudinally and outwardly extending from the bottom of two opposite sides of the base plate 50 respectively, and four stopping blocks 52 extending outwardly from the front and from the rear ends of the two opposite sides of the base plate 50. The base plate 50 has a third connecting hole 53 positioned at the same side with the second connecting hole 43 thereof, and a fourth connecting hole 54 positioned at the same side with the first connecting hole 42 thereof. An opening 55 is formed between each stopping block 52 and the adjacent end of the sliding rail 51. A fixing hole 56 communicating with the opening 55 is defined at the place of the base plate 50 corresponding to the opening 55. The slider 5 further includes four cushions 57. Each cushion 57 has a body 570 and a fixing portion 571 extending inwardly from the top of the body 570. The body 570 is fixed in the opening 55. The fixing portion 571 is fixed in the fixing hole 56.

Referring to FIG. 1 again, the first torsion spring 6 has a first coil 60, a first elastic shaft 61 and a third elastic shaft 62 respectively extending from two ends of the first coil 60, and a first connecting end 63 and a third connecting end 64 respectively formed at free ends of the first elastic shaft 61 and the third elastic shaft 62. The first connecting end 63 and the third connecting end 64 are respectively connected to the first connecting hole 42 and the third connecting hole 53 by rivets 8. The second torsion spring 7 has a second coil 70, a second elastic shaft 71 and a fourth elastic shaft 72 respectively extending from two ends of the second coil 70, and a second connecting end 73 and a fourth connecting end 74 respectively formed at free ends of the second elastic shaft 71 and the fourth elastic shaft 72. The second connecting end 73 and the fourth connecting end 74 are respectively connected to the second connecting hole 43 and the fourth connecting hole 54 by rivets 8. In this embodiment, the first torsion spring 6 is the same as the second torsion spring 7.

Figure 5:
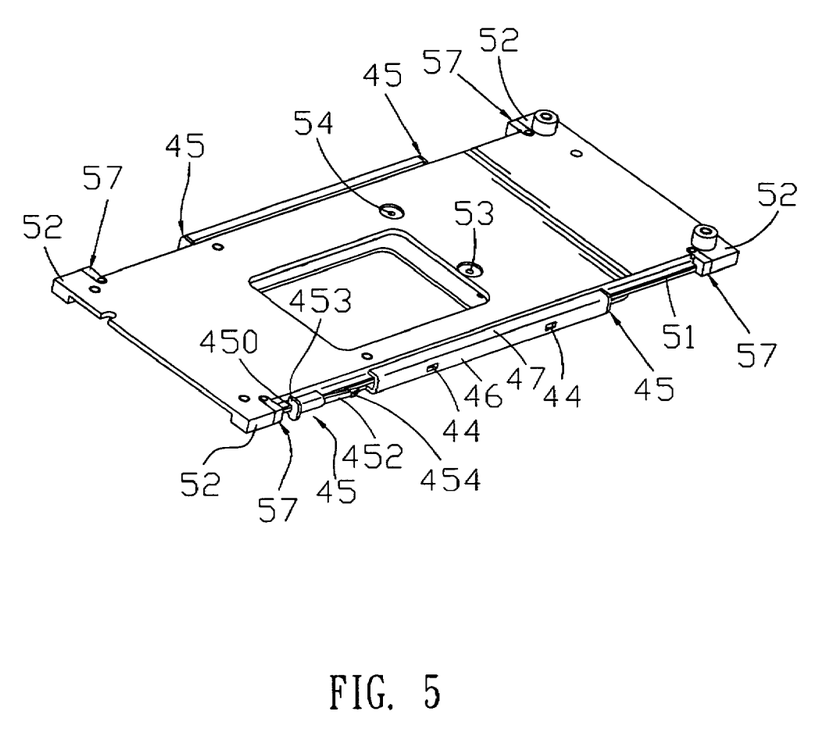
FIG. 5 is an exploded view of the sliding-type hinge showing a retainer of the base.
Figure 6:
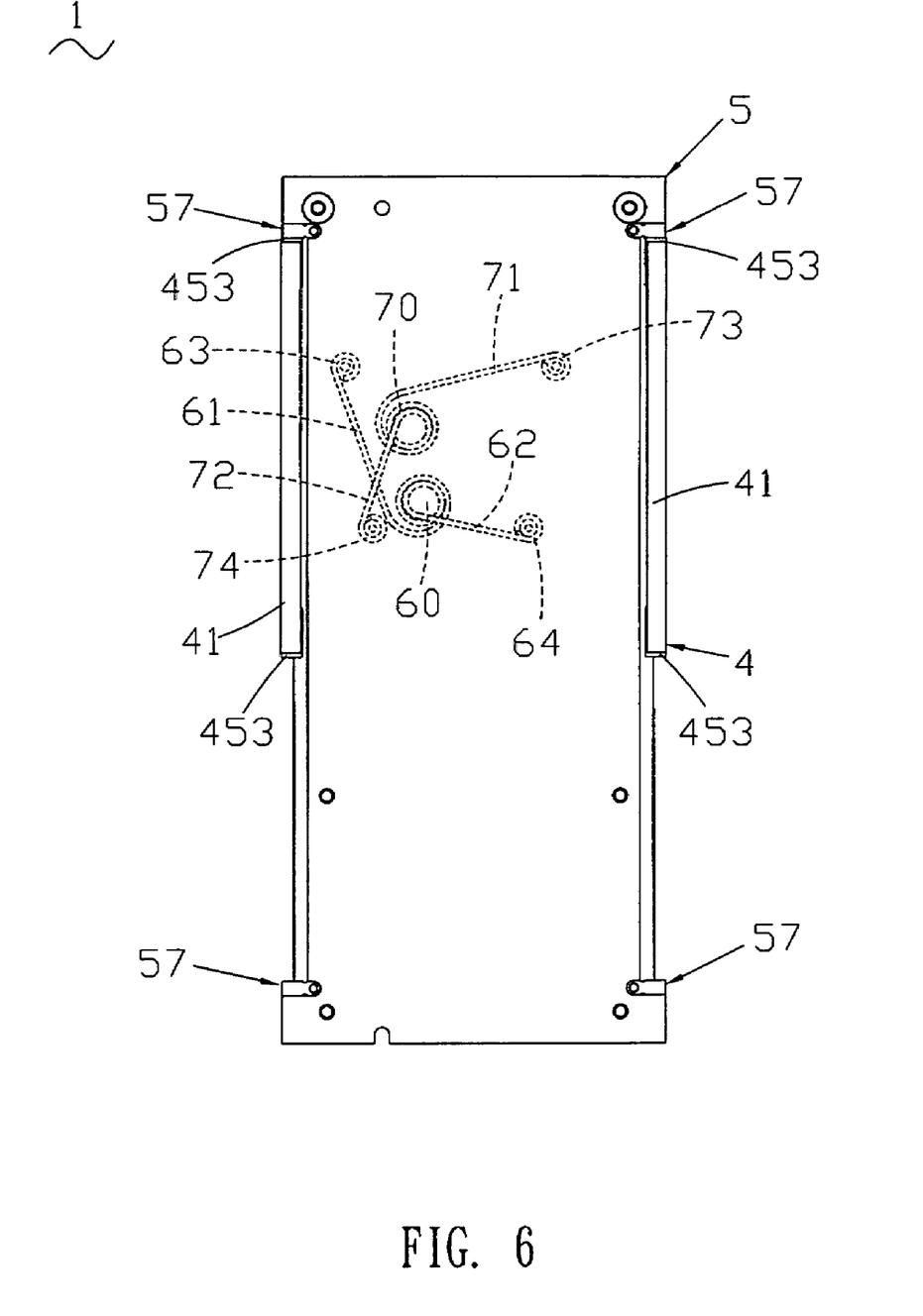
FIG. 6 is a bottom plan view showing the sliding-type hinge at the closing status.

With reference to FIG. 5 and FIG. 6, each retainer 45 is squeezed into the sliding chute 41 from one end of the sliding chute 41 after the slider 5 being disposed on the base 4. The chute body 450 and the elastic arm 452 are received in the sliding chute 41 and propping the sliding chute 41. The holding portion 454 is held in the holding opening 44. The contacting portion 453 attaches to the end of the sliding chute 41. After assembly, first, the sliding housing 3 is closed into the body housing 2, the contacting portions 453 of the two retainers 45 at the front of the base 4 contact the corresponding bodies 570 of the two cushions 57 at the front of the slider 5.

Referring to FIG. 6 again, when the mobile phone 100 is at a closing status, the first torsion spring 6 and the second torsion spring 7 are in a non-deformation state. The first connecting end 63, the second connecting end 73, the third connecting end 64 and the fourth connecting end 74 appear in an inverted isosceles trapezoid arrangement. The first connecting end 63 and the second connecting end 73 are at the front of the third connecting end 64 and the fourth connecting end 74 to constitute two end points of a bigger base of the inverted isosceles trapezoid. The third connecting end 64 and the fourth connecting end 74 constitute two end points of a smaller base of the inverted isosceles trapezoid. The fourth elastic shaft 72 crosses with and lies on the first elastic shaft 61. The first coil 60 is at the rear of the second coil 70.

Figure 7:
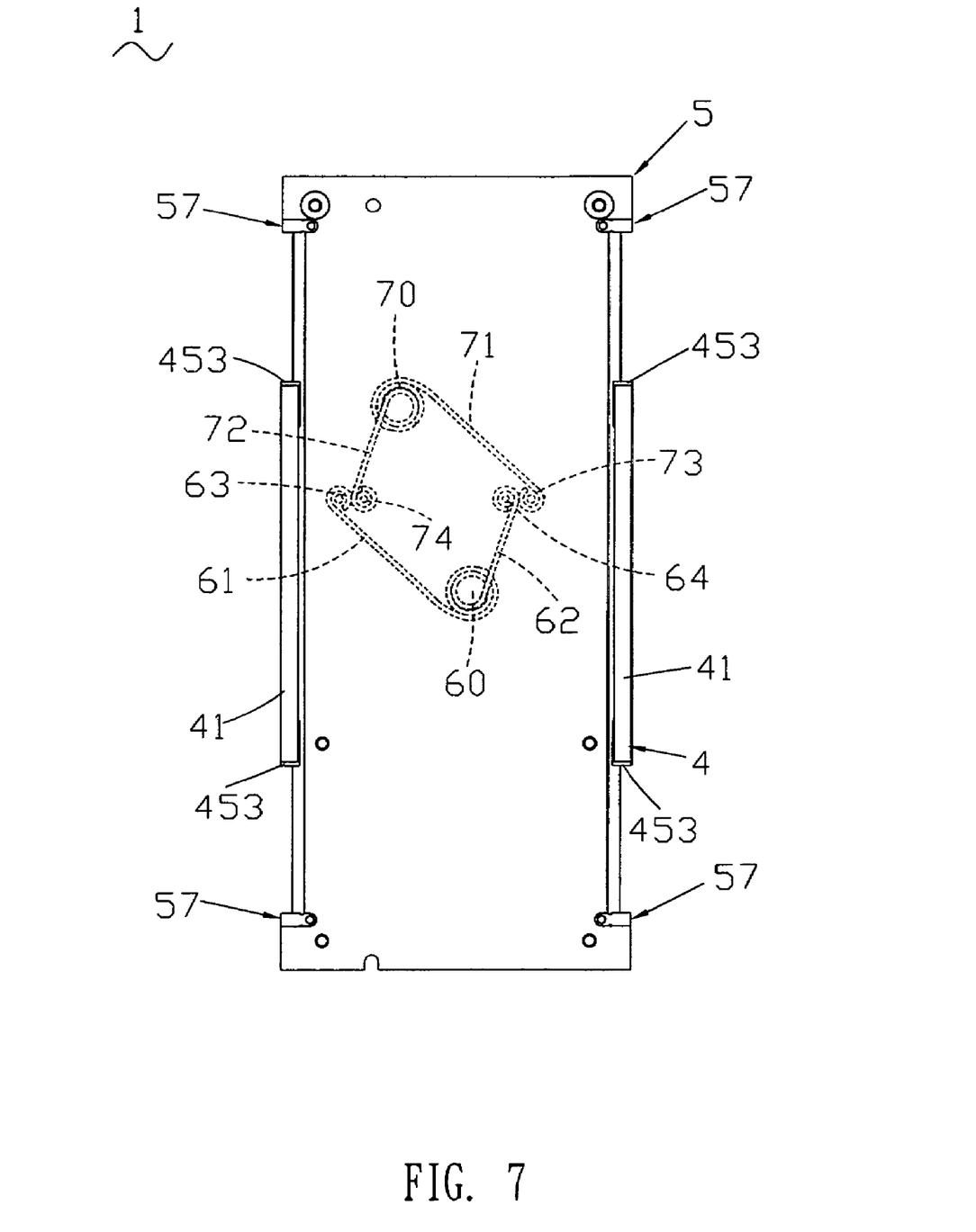
FIG. 7 is a bottom plan view of the sliding-type hinge when the stored elastic forces of the first torsion spring and the second torsion spring are maximized.

Referring to FIG. 6 and FIG. 7, when it needs to use the keypad zone 21, the user have to slide the slider housing 3 forward to open from the body housing 2. At this time, the first connecting end 63 and the second connecting end 73 respectively connecting with the corresponding connecting holes 42, 43 have no motion because of the body housing 2 and the base 4 having no motion. Owning to the chute body 450 and the elastic arm 452 of each retainer 45 rubbing against the sliding rail 51, the sliding rail 51 slides forward along the respective sliding chute 41 to move the slider 5 forward. Along with the slider 5 moving forward, the side length of the inverted isosceles trapezoid is reduced gradually. The third connecting end 64 of the first torsion spring 6 and the fourth connecting end 74 of the second torsion spring 7 gradually move forward to approach the first connecting end 63 and the second connecting end 73. Meanwhile, the stored elastic forces of the first torsion spring 6 and the second torsion spring 7 is increased gradually. When both of the distance between the first connecting end 63 and the third connecting end 64 and the distance between the second connecting end 73 and the fourth connecting end 74 are shortest, the stored elastic forces of the first torsion spring 6 and the second torsion spring 7 are maximized.

Figure 8:
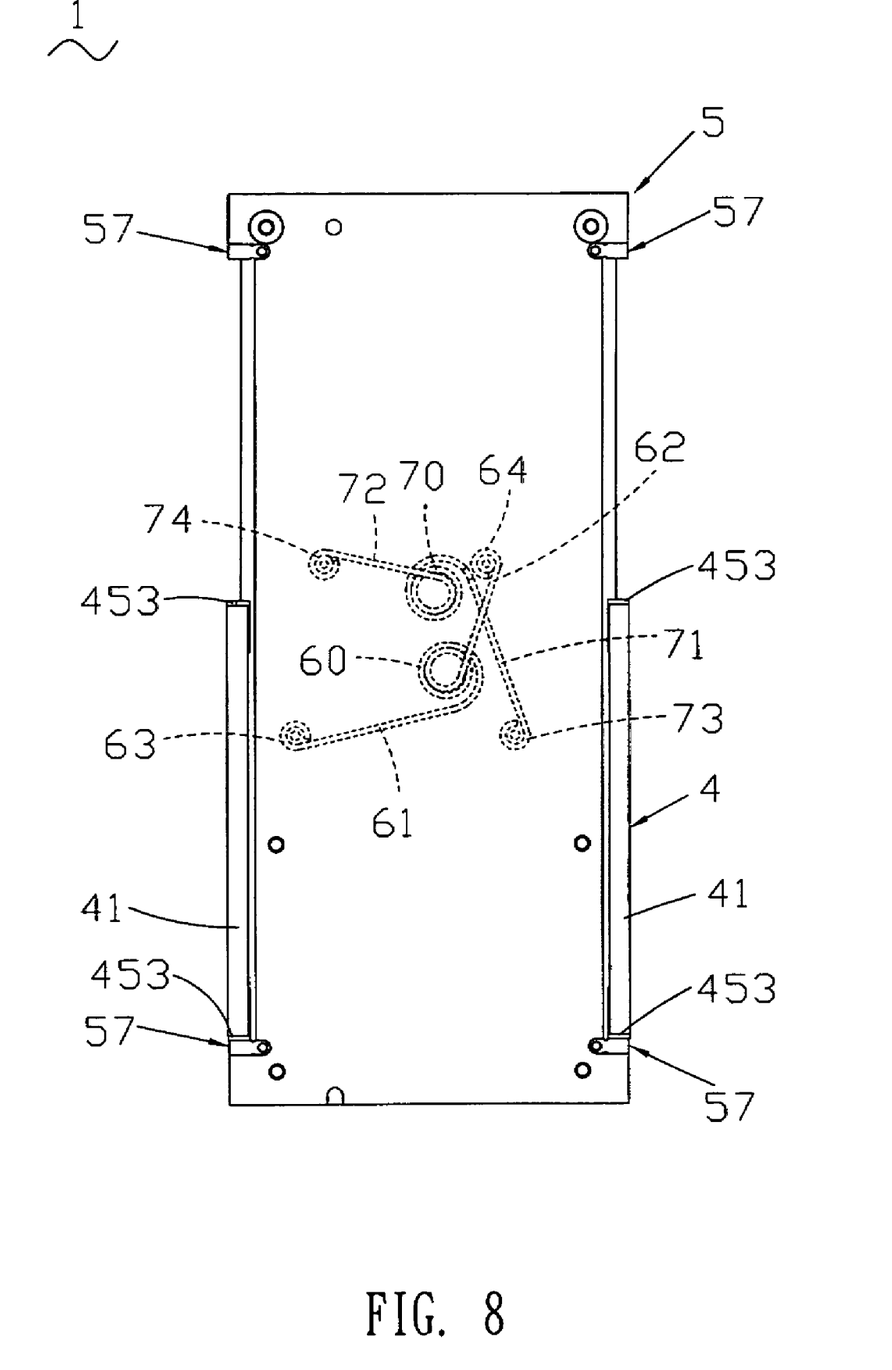
FIG. 8 is a bottom plan view showing the sliding-type hinge at the opening status.

Referring to FIG. 7 and FIG. 8, while the stored elastic forces of the first torsion spring 6 and the second torsion spring 7 maximized, although the user does not slide the sliding housing 3 on the body housing 2 forwardly, the third connecting end 64 and the fourth connecting end 74 would continue to move forward away from the first connecting end 63 and the second connecting end 7. In this case, the slider 5 would be moved forward further. At this time, the first connecting end 63, the second connecting end 73, the third connecting end 64 and the fourth connecting end 74 appear in a positive isosceles trapezoid arrangement. The first connecting end 63 and the second connecting end 73 are at the rear of the third connecting end 64 and the fourth connecting end 74 to constitute two end points of a bigger base of the positive isosceles trapezoid. The third connecting end 64 and the fourth connecting end 74 constitute two end points of a smaller base of the positive isosceles trapezoid. The side length of the isosceles trapezoid gradually increases until the bodies 570 of the two cushions 57 at the rear of the slider 5 respectively contact with the corresponding contacting portions 453 of the two retainers 45 at the rear of the base 4. At this time, the sliding housing 3 is completely opened from the body housing 2, so that the keypad zone 21 is exposed outside. Meanwhile, the first torsion spring 6 and the second torsion spring 7 recover to the non-deformation state again. The first torsion spring 6 and the second torsion spring 7 together form a same shape and inverted direction arrangement contrasting to the closing status. The first connecting end 63 and the second connecting end 73 are at the rear of the third connecting end 64 and the fourth connecting end 74. The third elastic shaft 62 crosses with and lies on the second elastic shaft 71. The first coil 60 is at the rear of the second coil 70.

As apparent from the above description, the embodiment of the present invention described above provides a sliding-type hinge adapted for a portable apparatus, which enables the portable apparatus to open or close by a base and a slider and two springs co-operating with each other. Further, the embodiment of the present invention has advantages of uncomplicated structure and not affecting appearance.

What is claimed is:

1. A sliding-type hinge mounted in a portable apparatus, the portable apparatus comprising a body housing and a sliding housing sliding forward and backward on the body housing by means of the sliding-type hinge to open from and close into the body housing, the sliding-type hinge comprising:

a base fixed on the body housing;

a slider fixed on the sliding housing; and a sliding means for sliding the slider forward and backward on the base, the sliding means comprising a first torsion spring and a second torsion spring disposed between the base and the slider, the first torsion spring having a first connecting end connected to one side of the base, and a third connecting end connected to the other side of the slider, the second torsion spring having a second connecting end connected to the slider and being at the same side with the third connecting end, and a fourth connecting end connected to the base and being at the same side with the first connecting end, wherein when the sliding housing being closed into the body housing, the first connecting end and the second connecting end being at the front of the third connecting end and the fourth connecting end, the first torsion spring and the second torsion spring being arranged in a cross-configuration;

when the sliding housing being opened from the body housing, the first connecting end and the second connecting end being at the rear of the third connecting end and the fourth connecting end, the first torsion spring and the second torsion spring being arranged in a cross-configuration;

wherein the first torsion spring has a first coil, a first elastic shaft and a third elastic shaft respectively extending from two ends of the first coil, and the first connecting end and the third connecting end respectively formed at free ends of the first elastic shaft and the third elastic shaft; the second torsion spring has a second coil, a second elastic shaft and a fourth elastic shaft respectively extending from two ends of the second coil, and the second connecting end and the fourth connecting end respectively formed at free ends of the second elastic shaft and the fourth elastic shaft;

wherein the base has a first connecting hole and a second connecting hole respectively positioned at two sides thereof, the slider has a third connecting hole positioned at the same side with the second connecting hole thereof and a fourth connecting hole positioned at the same side with the first connecting hole thereof, the first connecting end, the second connecting end, the third connecting end and the fourth connecting end are respectively connected to the first connecting hole, the second connecting hole, the third connecting hole and the fourth connecting hole by rivets; and when the sliding housing being closed into the body housing, the first connecting end, the second connecting end, the third connecting end and the fourth connecting end appearing in an inverted isosceles trapezoid arrangement, the first connecting end and the second connecting end being at the front of the third connecting end and the fourth connecting end to constitute two end points of a bigger base of the inverted isosceles trapezoid, the third connecting end and the fourth connecting end constituting two end points of a smaller base of the inverted isosceles trapezoid, the fourth elastic shaft crossing with and setting on the first elastic shaft, the first coil being at the rear of the second coil.

2. The sliding-type hinge as claimed in claim 1, wherein the base has a first connecting hole and a second connecting hole respectively positioned at two sides thereof, the slider has a third connecting hole positioned at the same side with the second connecting hole thereof and a fourth connecting hole positioned at the same side with the first connecting hole thereof, the first connecting end, the second connecting end, the third connecting end and the fourth connecting end are respectively connected to the first connecting hole, the second connecting hole, the third connecting hole and the fourth connecting hole by rivets.

3. The sliding-type hinge as claimed in claim 1, wherein the first torsion spring is the same as the second torsion spring.

4. The sliding-type hinge as claimed in claim 3, when the sliding housing being opened from the body housing, the first torsion spring and the second torsion spring together forming a same shape with an inverted direction arrangement contrasting to the closing status, the first connecting end and the second connecting end being at the rear of the second connecting end and the fourth connecting end, the third elastic shaft crossing with and setting on the top of the second elastic shaft, the first coil being at the rear of the second coil.

5. The sliding-type hinge as claimed in claim 1, wherein the first torsion spring and the second torsion spring are in a non-deformation state.

6. The sliding-type hinge as claimed in claim 4, wherein the first torsion spring and the second torsion spring are in a non-deformation state.

7. The sliding-type hinge as claimed in claim 1, wherein the portable apparatus is a mobile phone.

8. The sliding-type hinge as claimed in claim 1, wherein the base has a pair of sliding chutes longitudinally and respectively extending upwardly from two opposite sides thereof, and the slider has a pair of sliding rails longitudinally and respectively extending outwardly from the bottom of two opposite sides thereof, capable of sliding along the respective sliding chute.

9. The sliding-type hinge as claimed in claim 7, wherein the base further comprises four retainers, the retainer having an U-shaped chute body, an elastic arm extending from one end of side portion of the chute body, and a contacting portion extending perpendicularly outwardly from the other end of the chute body, the elastic arm having a holding portion extending outwardly from the end thereof the sliding chute has a pair of holding openings respectively defined at the front and rear sides thereof, the chute body and the elastic arm received in the sliding chute, the contacting portion attaching to the end of the sliding chute.

10. The sliding-type hinge as claimed in claim 8, wherein the slider further comprises four cushions, the cushion having a body and a fixing portion extending inwardly from the top of the body; the slider further has four stopping blocks respectively extending outwardly from the front and rear ends of the two opposite sides thereof, four receiving openings formed between the stopping blocks and adjacent ends of the sliding rails, and four fixing holes communicating with the receiving opening defined at the base plate, therefore the body being fixed in the opening and the fixing portion being fixed in the fixing hole.

11. A sliding-type hinge mounted in a portable apparatus, the portable apparatus comprising a body housing and a sliding housing sliding forward and backward on the body housing by means of the sliding-type hinge to open from and close into the body housing, the sliding-type hinge comprising:

a base fixed on the body housing;

a slider fixed on the sliding housing; and a sliding means for sliding the slider forward and backward on the base, the sliding means comprising a first torsion spring and a second torsion spring disposed between the base and the slider, the first torsion spring having a first connecting end connected to one side of the base, and a third connecting end connected to the other side of the slider, the second torsion spring having a second connecting end connected to the slider and being at the same side with the third connecting end, and a fourth connecting end connected to the base and being at the same side with the first connecting end, wherein when the sliding housing being closed into the body housing, the first connecting end and the second connecting end being at the front of the third connecting end and the fourth connecting end, the first torsion spring and the second torsion spring being arranged in a cross-configuration;

when the sliding housing being opened from the body housing, the first connecting end and the second connecting end being at the rear of the third connecting end and the fourth connecting end, the first torsion spring and the second torsion spring being arranged in a cross-configuration;

wherein the portable apparatus is a mobile phone; and wherein the base further comprises four retainers, the retainer having an U-shaped chute body, an elastic arm extending from one end of side portion of the chute body, and a contacting portion extending perpendicularly outwardly from the other end of the chute body, the elastic arm having a holding portion extending outwardly from the end thereof; the sliding chute has a pair of holding openings respectively defined at the front and rear sides thereof, the chute body and the elastic arm received in the sliding chute, the contacting portion attaching to the end of the sliding chute.

12. The sliding-type hinge as claimed in claim 11, wherein the first torsion spring has a first coil, a first elastic shaft and a third elastic shaft respectively extending from two ends of the first coil, and the first connecting end and the third connecting end respectively formed at free ends of the first elastic shaft and the third elastic shaft; the second torsion spring has a second coil, a second elastic shaft and a fourth elastic shaft respectively extending from two ends of the second coil, and the second connecting end and the fourth connecting end respectively formed at free ends of the second elastic shaft and the fourth elastic shaft.

13. The sliding-type hinge as claimed in claim 11, wherein the base has a first connecting hole and a second connecting hole respectively positioned at two sides thereof, the slider has a third connecting hole positioned at the same side with the second connecting hole thereof and a fourth connecting hole positioned at the same side with the first connecting hole thereof, the first connecting end, the second connecting end, the third connecting end and the fourth connecting end are respectively connected to the first connecting hole, the second connecting hole, the third connecting hole and the fourth connecting hole by rivets.

14. The sliding-type hinge as claimed in claim 12, wherein the base has a first connecting hole and a second connecting hole respectively positioned at two sides thereof, the slider has a third connecting hole positioned at the same side with the second connecting hole thereof and a fourth connecting hole positioned at the same side with the first connecting hole thereof, the first connecting end, the second connecting end, the third connecting end and the fourth connecting end are respectively connected to the first connecting hole, the second connecting hole, the third connecting hole and the fourth connecting hole by rivets.

15. The sliding-type hinge as claimed in claim 12, wherein the first torsion spring is the same as the second torsion spring.

16. The sliding-type hinge as claimed in claim 15, when the sliding housing being opened from the body housing, the first torsion spring and the second torsion spring together forming a same shape with an inverted direction arrangement contrasting to the closing status, the first connecting end and the second connecting end being at the rear of the second connecting end and the fourth connecting end, the third elastic shaft crossing with and setting on the top of the second elastic shaft, the first coil being at the rear of the second coil.

17. The sliding-type hinge as claimed in claim 16, wherein the first torsion spring and the second torsion spring are in a non-deformation state.

18. The sliding-type hinge as claimed in claim 11, wherein the base has a pair of sliding chutes longitudinally and respectively extending upwardly from two opposite sides thereof, and the slider has a pair of sliding rails longitudinally and respectively extending outwardly from the bottom of two opposite sides thereof, capable of sliding along the respective sliding chute.

19. The sliding-type hinge as claimed in claim 18, wherein the slider further comprises four cushions, the cushion having a body and a fixing portion extending inwardly from the top of the body; the slider further has four stopping blocks respectively extending outwardly from the front and rear ends of the two opposite sides thereof, four receiving openings formed between the stopping blocks and adjacent ends of the sliding rails, and four fixing holes communicating with the receiving opening defined at the base plate, therefore the body being fixed in the opening and the fixing portion being fixed in the fixing hole.

20. The sliding-type hinge as claimed in claim 11, wherein the slider further comprises four cushions, the cushion having a body and a fixing portion extending inwardly from the top of the body; the slider further has four stopping blocks respectively extending outwardly from the front and rear ends of the two opposite sides thereof, four receiving openings formed between the stopping blocks and adjacent ends of the sliding rails, and four fixing holes communicating with the receiving opening defined at the base plate, therefore the body being fixed in the opening and the fixing portion being fixed in the fixing hole.

* * * * *